United States Patent
Liu et al.

(10) Patent No.: US 9,343,086 B1
(45) Date of Patent: May 17, 2016

(54) MAGNETIC RECORDING WRITE TRANSDUCER HAVING AN IMPROVED SIDEWALL ANGLE PROFILE

(71) Applicant: Western Digital (Fremont), LLC, Fremont, CA (US)

(72) Inventors: Feng Liu, San Ramon, CA (US); Zhigang Bai, Fremont, CA (US); Yugang Wang, Milpitas, CA (US); Tao Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/051,359

(22) Filed: Oct. 10, 2013

Related U.S. Application Data

(60) Provisional application No. 61/876,340, filed on Sep. 11, 2013.

(51) Int. Cl.
*G11B 5/147* (2006.01)
*G11B 5/127* (2006.01)

(52) U.S. Cl.
CPC .................................... *G11B 5/1278* (2013.01)

(58) Field of Classification Search
CPC ............................ G11B 5/3116; G11B 5/1278
USPC ........................................ 360/125.08–125.15
See application file for complete search history.

(56) References Cited

U.S. PATENT DOCUMENTS

| | | | |
|---|---|---|---|
| 5,801,910 A | 9/1998 | Mallary | |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |
| 6,103,073 A | 8/2000 | Thayamballi | |
| 6,108,166 A | 8/2000 | Lederman | |
| 6,118,629 A | 9/2000 | Huai et al. | |
| 6,118,638 A | 9/2000 | Knapp et al. | |
| 6,125,018 A | 9/2000 | Takagishi et al. | |

(Continued)

OTHER PUBLICATIONS

U.S. Appl. No. 13/631,808, filed Sep. 28, 2012, to Liu et al., 16 pages.

*Primary Examiner* — Gustavo Polo

(57) ABSTRACT

A method and system provide a magnetic transducer having an air-bearing surface (ABS). The magnetic transducer includes a main pole and at least one coil for energizing the main pole. The main pole includes a pole tip region and a yoke region. The pole tip region includes sidewalls, a bottom and a top wider than the bottom. At least one of the sidewalls forms a first sidewall angle with a down track direction at the ABS and a second sidewall angle with the down track direction at a first distance recessed from the ABS. The first sidewall angle is greater than the second sidewall angle.

28 Claims, 6 Drawing Sheets

(56) References Cited

U.S. PATENT DOCUMENTS

| | | | |
|---|---|---|---|
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,172,848 B1 | 1/2001 | Santini |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,675 B1 | 1/2003 | Shukh et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |

(56) References Cited

U.S. PATENT DOCUMENTS

| | | |
|---|---|---|
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,710,973 B2 | 3/2004 | Okada et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,722,018 B2 | 4/2004 | Santini |
| 6,724,569 B1 | 4/2004 | Chen et al. |
| 6,724,572 B1 | 4/2004 | Stoev et al. |
| 6,729,015 B2 | 5/2004 | Matono et al. |
| 6,731,460 B2 | 5/2004 | Sasaki |
| 6,735,850 B1 | 5/2004 | Gibbons et al. |
| 6,737,281 B1 | 5/2004 | Dang et al. |
| 6,738,223 B2 | 5/2004 | Sato et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,762,911 B2 | 7/2004 | Sasaki et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,813,116 B2 | 11/2004 | Nakamura et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,857,181 B2 | 2/2005 | Lo et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,697 B2 | 5/2005 | Nakamura et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,903,900 B2 | 6/2005 | Sato et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,255 B2 | 9/2005 | Hsiao et al. |
| 6,947,258 B1 | 9/2005 | Li |
| 6,950,266 B1 | 9/2005 | McCaslin et al. |
| 6,950,277 B1 | 9/2005 | Nguy et al. |
| 6,952,325 B2 | 10/2005 | Sato et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 6,995,949 B2 | 2/2006 | Nakamura et al. |
| 7,006,326 B2 | 2/2006 | Okada et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,070,698 B2 | 7/2006 | Le |
| 7,092,195 B1 | 8/2006 | Liu et al. |
| 7,100,266 B2 | 9/2006 | Plumer et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,252 B2 | 11/2006 | Takano et al. |
| 7,133,253 B1 | 11/2006 | Seagle et al. |
| 7,134,185 B1 | 11/2006 | Knapp et al. |
| 7,139,153 B2 | 11/2006 | Hsiao et al. |
| 7,154,715 B2 | 12/2006 | Yamanaka et al. |
| 7,159,302 B2 | 1/2007 | Feldbaum et al. |
| 7,170,725 B1 | 1/2007 | Zhou et al. |
| 7,177,117 B1 | 2/2007 | Jiang et al. |
| 7,185,415 B2 | 3/2007 | Khera et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,206,166 B2 | 4/2007 | Notsuke et al. |
| 7,211,339 B1 | 5/2007 | Seagle et al. |
| 7,212,379 B2 | 5/2007 | Hsu et al. |
| 7,212,384 B1 | 5/2007 | Stoev et al. |
| 7,238,292 B1 | 7/2007 | He et al. |
| 7,239,478 B1 | 7/2007 | Sin et al. |
| 7,245,454 B2 | 7/2007 | Aoki et al. |
| 7,248,431 B1 | 7/2007 | Liu et al. |
| 7,248,433 B1 | 7/2007 | Stoev et al. |
| 7,248,449 B1 | 7/2007 | Seagle |
| 7,251,878 B2 | 8/2007 | Le et al. |
| 7,253,992 B2 | 8/2007 | Chen et al. |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,338 B2 | 11/2007 | Le et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,324,304 B1 | 1/2008 | Benakli et al. |
| 7,333,295 B1 | 2/2008 | Medina et al. |
| 7,337,530 B1 | 3/2008 | Stoev et al. |

(56) References Cited

U.S. PATENT DOCUMENTS

| | | |
|---|---|---|
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,369,359 B2 | 5/2008 | Fujita et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,392,577 B2 | 7/2008 | Yazawa et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,095 B2 | 9/2008 | Benakli et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,441,325 B2 | 10/2008 | Gao et al. |
| 7,443,632 B1 | 10/2008 | Stoev et al. |
| 7,444,740 B1 | 11/2008 | Chung et al. |
| 7,464,457 B2 | 12/2008 | Le et al. |
| 7,469,467 B2 | 12/2008 | Gao et al. |
| 7,493,688 B1 | 2/2009 | Wang et al. |
| 7,508,626 B2 | 3/2009 | Ichihara et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,535,675 B2 | 5/2009 | Kimura et al. |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,558,019 B2 | 7/2009 | Le et al. |
| 7,580,222 B2 | 8/2009 | Sasaki et al. |
| 7,583,466 B2 | 9/2009 | Kermiche et al. |
| 7,595,967 B1 | 9/2009 | Moon et al. |
| 7,639,451 B2 * | 12/2009 | Yatsu et al. ............... 360/125.09 |
| 7,639,452 B2 | 12/2009 | Mochizuki et al. |
| 7,639,457 B1 | 12/2009 | Chen et al. |
| 7,643,246 B2 | 1/2010 | Yazawa et al. |
| 7,660,080 B1 | 2/2010 | Liu et al. |
| 7,663,839 B2 | 2/2010 | Sasaki et al. |
| 7,672,079 B2 | 3/2010 | Li et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,748,104 B2 | 7/2010 | Bonhote et al. |
| 7,785,666 B1 | 8/2010 | Sun et al. |
| 7,796,356 B1 | 9/2010 | Fowler et al. |
| 7,796,360 B2 | 9/2010 | Im et al. |
| 7,796,361 B1 | 9/2010 | Sasaki et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,841,068 B2 | 11/2010 | Chen et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,425 B2 | 3/2011 | Sasaki et al. |
| 7,916,426 B2 | 3/2011 | Hu et al. |
| 7,918,013 B1 | 4/2011 | Dunn et al. |
| 7,924,528 B2 | 4/2011 | Sasaki et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,027,125 B2 | 9/2011 | Lee et al. |
| 8,059,367 B2 * | 11/2011 | Lee et al. ................... 360/125.3 |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,033 B2 | 2/2012 | Kameda et al. |
| 8,116,043 B2 | 2/2012 | Leng et al. |
| 8,116,171 B1 | 2/2012 | Lee |
| 8,125,732 B2 | 2/2012 | Bai et al. |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,184,399 B2 | 5/2012 | Wu et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,233 B1 * | 7/2012 | Shen et al. ............... 360/125.03 |
| 8,233,234 B2 | 7/2012 | Hsiao et al. |
| 8,233,235 B2 | 7/2012 | Chen et al. |
| 8,233,248 B1 | 7/2012 | Li et al. |
| 8,248,728 B2 | 8/2012 | Yamaguchi et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,792 B2 | 9/2012 | Bai et al. |
| 8,264,797 B2 | 9/2012 | Emley |
| 8,264,798 B1 | 9/2012 | Guan et al. |
| 8,270,109 B2 | 9/2012 | Ohtsu |

(56) References Cited

U.S. PATENT DOCUMENTS

| | | |
|---|---|---|
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,649 B2 | 10/2012 | Sasaki et al. |
| 8,289,821 B1 | 10/2012 | Huber |
| 8,291,743 B1 | 10/2012 | Shi et al. |
| 8,305,711 B2 | 11/2012 | Li et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,347,488 B2 | 1/2013 | Hong et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 2003/0076630 A1 | 4/2003 | Sato et al. |
| 2004/0061988 A1 | 4/2004 | Matono et al. |
| 2004/0184191 A1 | 9/2004 | Ichihara et al. |
| 2005/0117251 A1 | 6/2005 | Matono et al. |
| 2006/0044677 A1 | 3/2006 | Li et al. |
| 2006/0158779 A1 | 7/2006 | Ota et al. |
| 2006/0174474 A1 | 8/2006 | Le |
| 2006/0225268 A1 | 10/2006 | Le et al. |
| 2006/0288565 A1 | 12/2006 | Le et al. |
| 2007/0211380 A1 | 9/2007 | Akimoto et al. |

(56) References Cited

U.S. PATENT DOCUMENTS

| | | |
|---|---|---|
| 2007/0236834 A1 | 10/2007 | Toma et al. |
| 2007/0247746 A1 | 10/2007 | Kim et al. |
| 2007/0258167 A1 | 11/2007 | Allen et al. |
| 2007/0263324 A1 | 11/2007 | Allen et al. |
| 2007/0283557 A1 | 12/2007 | Chen et al. |
| 2008/0002309 A1 | 1/2008 | Hsu et al. |
| 2008/0151437 A1 | 6/2008 | Chen et al. |
| 2009/0279206 A1 | 11/2009 | Yang et al. |
| 2010/0146773 A1 | 6/2010 | Li et al. |
| 2010/0277832 A1 | 11/2010 | Bai et al. |
| 2010/0290157 A1 | 11/2010 | Zhang et al. |
| 2011/0051293 A1 | 3/2011 | Bai et al. |
| 2011/0086240 A1 | 4/2011 | Xiang et al. |
| 2011/0222188 A1 | 9/2011 | Etoh et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0268845 A1 | 10/2012 | Sahoo et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |

\* cited by examiner

Prior Art
ABS View

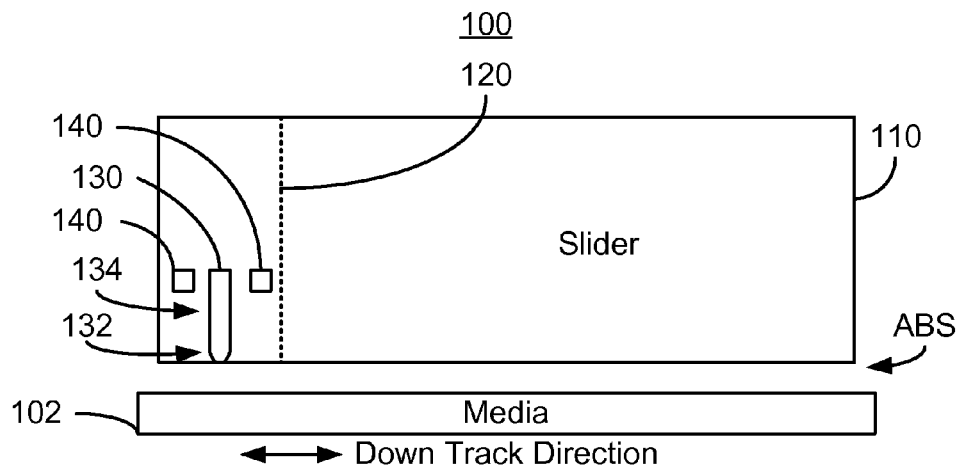
FIG. 2
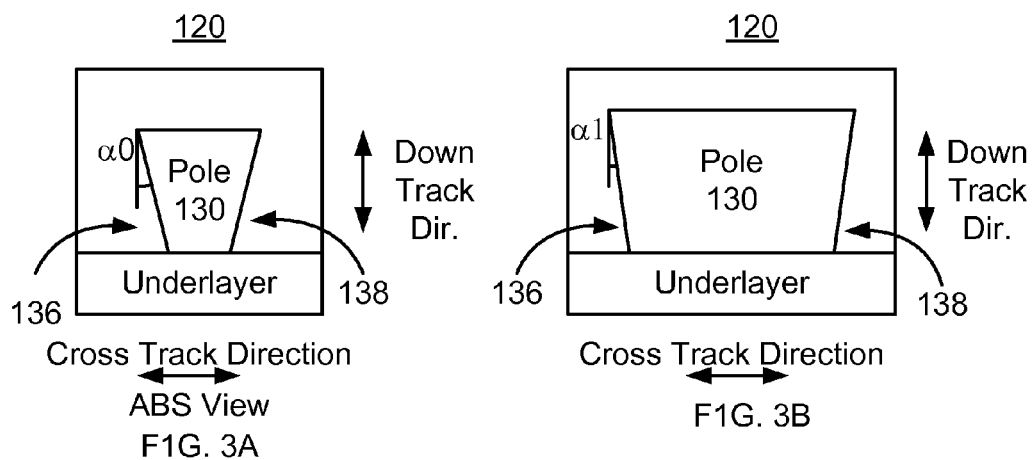
ABS View
FIG. 3A
FIG. 3B
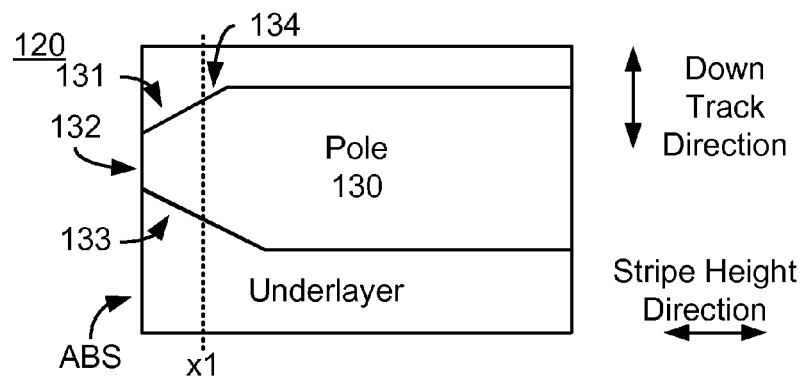
FIG. 3C

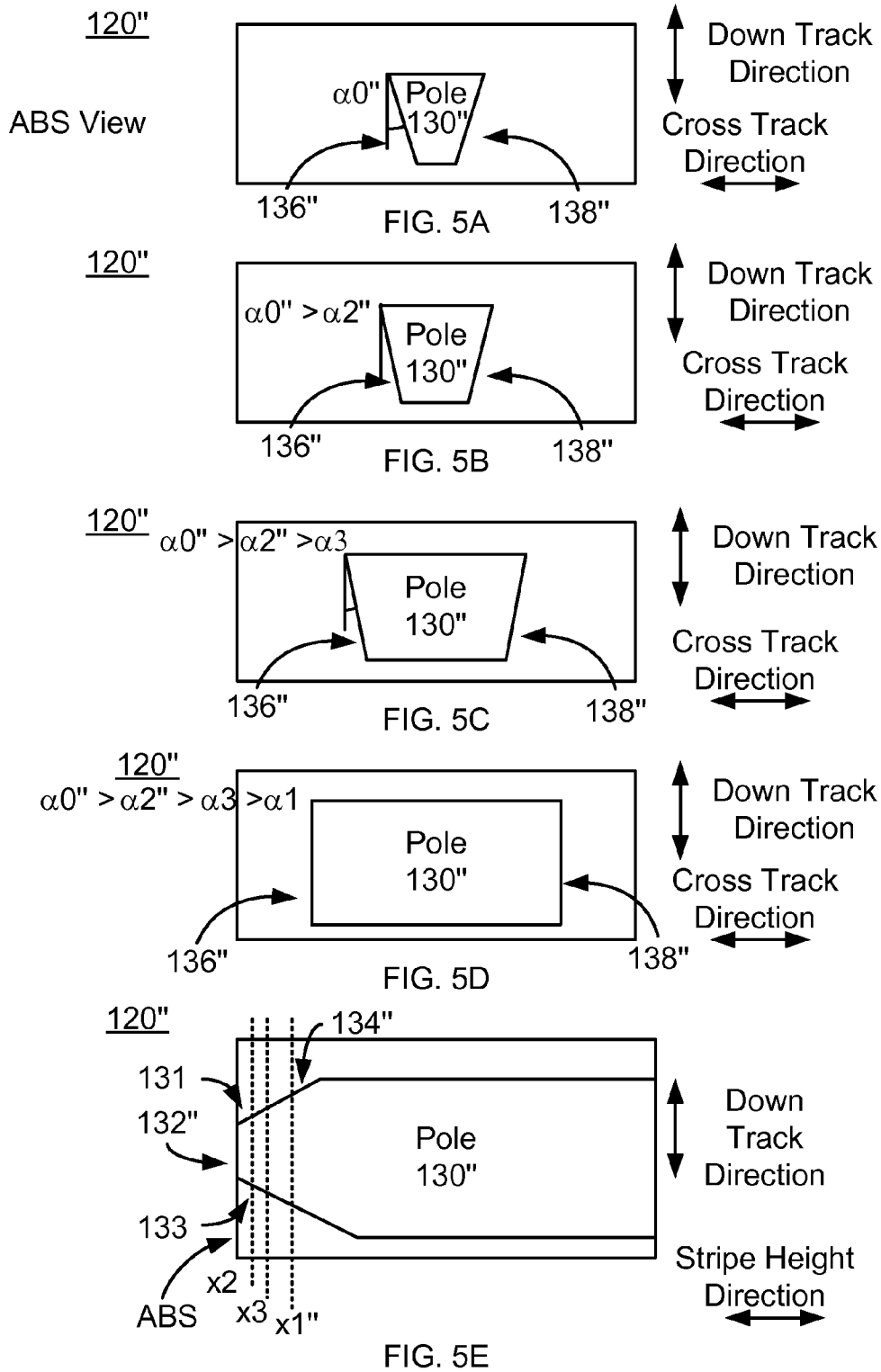

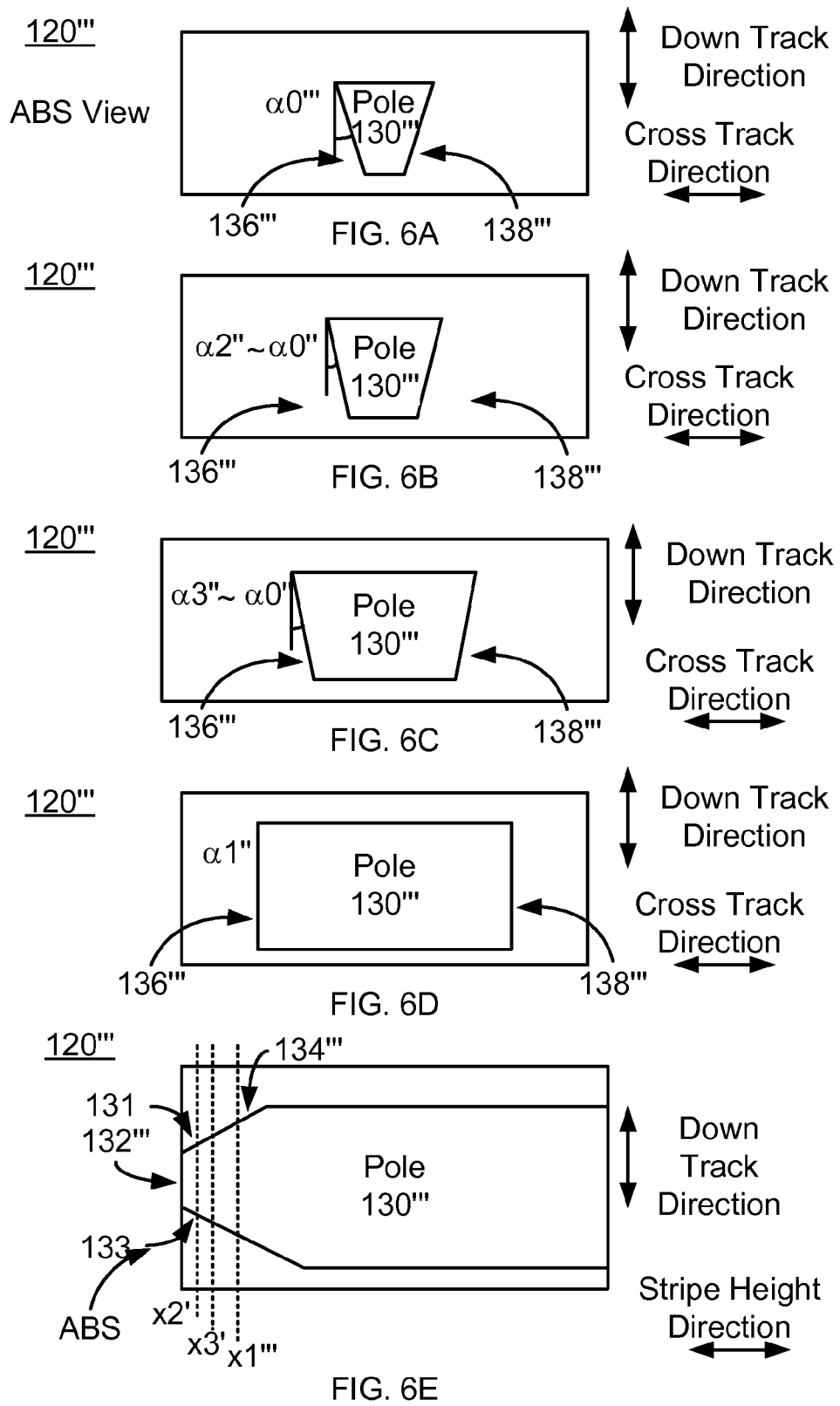

US 9,343,086 B1

MAGNETIC RECORDING WRITE TRANSDUCER HAVING AN IMPROVED SIDEWALL ANGLE PROFILE

CROSS-REFERENCE TO RELATED APPLICATIONS

This application claims priority to provisional U.S. Patent Application Ser. No. 61/876,340, filed on Sep. 11, 2013, which is hereby incorporated by reference in its entirety.

BACKGROUND

FIGS. 1A, 1B and 1C depict ABS, yoke and side views of a conventional magnetic recording head 10. The magnetic recording transducer 10 may be a perpendicular magnetic recording (PMR) head. The conventional magnetic recording transducer 10 may be a part of a merged head including the write transducer 10 and a read transducer (not shown). Alternatively, the magnetic recording head may be a write head including only the write transducer 10. Although termed a yoke view, the view shown in FIG. 1B is taken along the surface parallel to the ABS a distance x1 from the ABS. This surface is depicted as a dotted line in FIG. 1C.

The main pole 20 resides on an underlayer 12 and includes sidewalls 22 and 24. The sidewalls 22 and 24 of the conventional main pole 20 form an angle $\alpha 0$ with the down track direction at the ABS and an angle $\alpha 1$ with the down track direction at the distance x1 from the ABS. As can be seen in FIGS. 1A and 1B, portions of the main pole 20 recessed from the ABS in the stripe height direction are wider in the cross track direction than at the ABS. In addition, the angle between the sidewalls 22 and 24 and the down track direction increases. Thus, $\alpha 1$ is greater than $\alpha 0$. For example, if $\alpha 0$ is on the order of 13°, then $\alpha 1$ may be 25°.

Although the conventional magnetic recording head 10 functions, there are drawbacks. In particular, the conventional magnetic recording head 10 may not perform sufficiently at higher recording densities. For example, the write field of the conventional main pole 20 may not have a sufficiently high magnitude write field to meet particular standards. Accordingly, what is needed is a system and method for improving the performance of a magnetic recording head.

BRIEF DESCRIPTION OF SEVERAL VIEWS OF THE DRAWINGS

FIG. 2 depicts an exemplary embodiment of a magnetic recording disk drive.

FIGS. 3A, 3B and 3C depict ABS, yoke and side views of an exemplary embodiment of a magnetic recording transducer.

FIGS. 5A, 5B, 5C, 5D and 5E depict ABS and various views and a side view of an exemplary embodiment of a magnetic recording transducer.

FIGS. 6A, 6B, 6C, 6D and 6E depict ABS and various views and a side view of an exemplary embodiment of a magnetic recording transducer.

DETAILED DESCRIPTION OF THE PREFERRED EMBODIMENTS

Figure 1A:
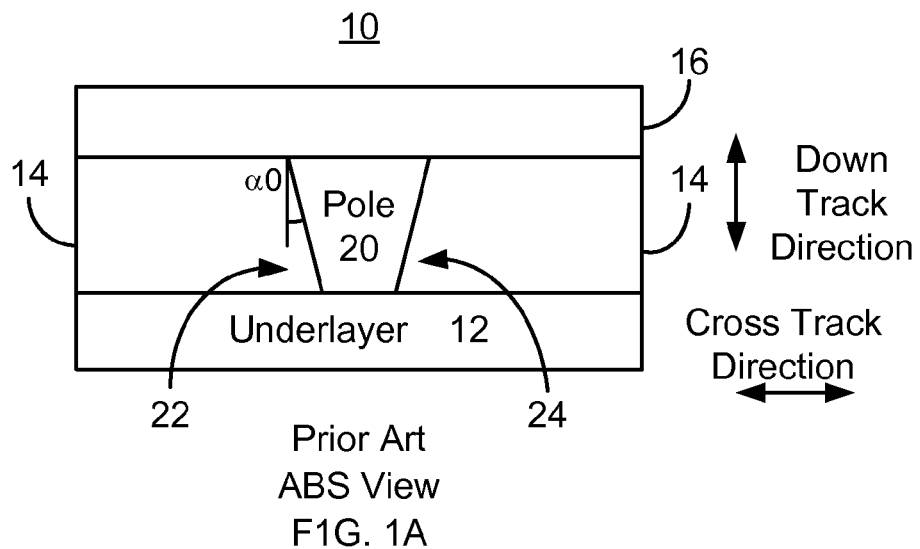
FIGS. 1A-1C depict ABS, yoke and side view of a conventional magnetic recording head.
Figure 1B:
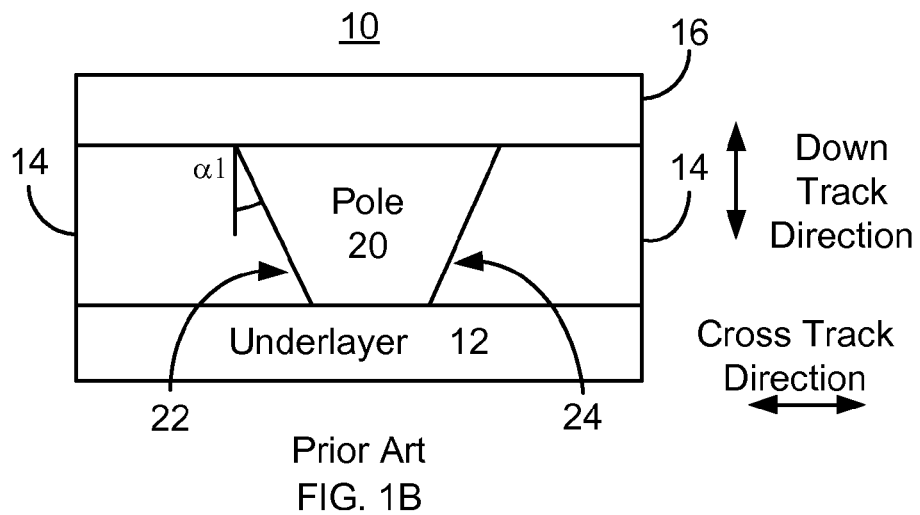
Figure 1C:
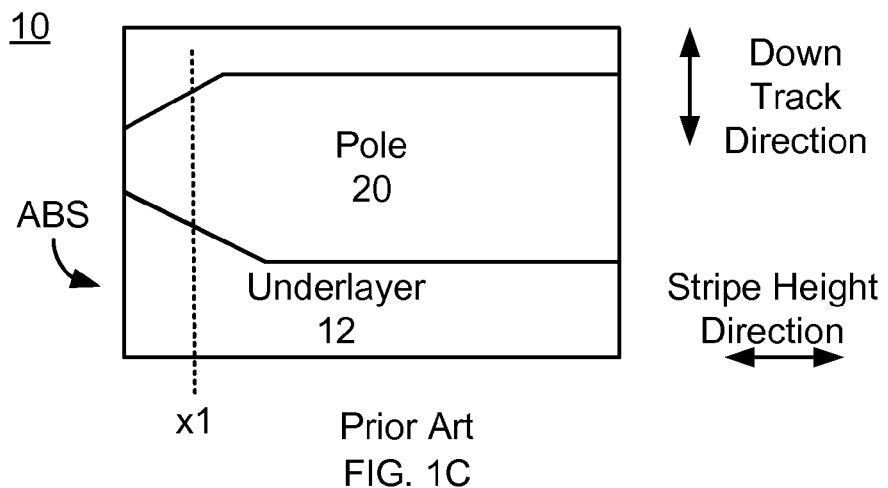

FIG. 2 depicts a side view of an exemplary embodiment of a portion of a disk drive 100 including a write transducer 120. FIGS. 3A, 3B and 3C depict ABS, yoke and side views of the transducer 120. For clarity, FIGS. 2, 3A, 3B and 3C are not to scale. For simplicity not all portions of the disk drive 100 and transducer 120 are shown. In addition, although the disk drive 100 and transducer 120 are depicted in the context of particular components other and/or different components may be used. For example, circuitry used to drive and control various portions of the disk drive 100 is not shown. For simplicity, only single components 102, 110, 120 and 130 are shown. However, multiples of each components 102, 110, 120 and/or and their sub-components, might be used. The disk drive 100 may be a PMR disk drive. However, in other embodiments, the disk drive 100 may be configured for other types of magnetic recording.

The disk drive 100 includes media 102, a slider 110 and a write transducer 120. Additional and/or different components may be included in the disk drive 100. Although not shown, the slider 110 and thus the transducer 120 are generally attached to a suspension (not shown).

The transducer 120 is fabricated on the slider 110 and includes an air-bearing surface (ABS) proximate to the media 102 during use. In general, the disk drive 100 includes a write transducer 120 and a read transducer (not shown). However, for clarity, only the write transducer 120 is shown. The transducer 120 includes a main pole 130 and coils 140. In other embodiments, different and/or additional components may be used in the write transducer 120.

The coil(s) 140 are used to energize the main pole 130. Two turns 140 are depicted in FIG. 2. Another number of turns may, however, be used. Note that only a portion of the coil(s) 140 is shown in FIG. 2. If, for example, the coil(s) 140 form a helical coil, then additional portion(s) of the coil(s) 140 may be located on the opposite side of the main pole 130 as is shown. If the coil(s) 140 is a spiral, or pancake, coil, then additional portions of the coil(s) 140 may be located further from the ABS. Further, additional coils may also be used.

The main pole 130 includes a pole tip region 132 close to the ABS and a yoke region 134 recessed from the ABS. The pole tip region 132 is shown as having top and bottom bevels 131 and 133, respectively, near the ABS. In addition, the pole tip region 134 includes sidewalls 136 and 138 in the cross track direction. The sidewalls are configured such that the pole 130 has a bottom and a top wider than the bottom.

The sidewalls 136 and 138 form sidewall angles with the down track direction. At the ABS, the sidewall 136 forms sidewall angle $\alpha 0$ with respect to the down track direction. In some embodiments, the sidewalls 136 and 138 are symmetric. Thus, although not labeled, the sidewall 138 would form substantially the same sidewall angle with the down track direction as the sidewall 136. In some embodiments, $\alpha 0$ is not more than fourteen degrees. In some such embodiments, $\alpha 0$ is at least twelve degrees. For example, $\alpha 0$ may be nominally 13.5°. At a distance x1 recessed from the ABS, the sidewall 136 forms sidewall angle $\alpha 1$ with the down track direction. The sidewall angle $\alpha 1$ is less than $\alpha 0$ at x1. For example, if $\alpha 0$ is 12-14 degrees, then $\alpha 1$ is greater than or equal to zero degrees and not more than 12-14 degrees. In some embodiments, $\alpha 1$ is at least seven degrees. Further, the distance x1 may vary. In some embodiments, x1 is desired to be not more than the distance which the bevel 131 or 133 extends into the ABS. For example, in some embodiments, x1 is not more than two hundred nanometers. In some embodiments, x1 is desired to be closer to the ABS. In some embodiments, x1 may be not more than eighty nanometers. For example, x1 may be at least 30 nm from the ABS if, for example, the processing tolerance in the location of x1 is 10 nm (corresponding to a 3σ of 30 nm). In general, x1 is desired to be sufficiently large that the sidewall angle α0 at the ABS remains unchanged. The manner in which the sidewall angle changes from α0 to α1 may vary. The sidewall angle may monotonically decrease between the ABS and x1. In some embodiments, the sidewall angle smoothly varies from α0 to α1. In other embodiments, the sidewall angle may change in step function(s) from α0 to α1. Although described herein as step function(s), one of ordinary skill in the art will recognize that there are processing and/or other limitations or considerations. Therefore, the transitions of such a "step" function may be rounded and/or transitions may not be sharp. Thus, as used herein, a step function may not be identical to a purely mathematical step function. This may occur at x1 or between the ABS and x1. In other embodiments, the change may be linear or piece-wise linear. In other embodiments the change may be in accordance with a higher order function including but not limited to a quadratic function. However, other configurations are possible. Although described herein in terms of particular mathematical functions, one of ordinary skill in the art will recognize that there are processing and/or other limitations or considerations. Consequently, the actual profile of the main poles may not precisely follow the mathematical functions used herein.

The magnetic disk drive 100 may exhibit improved performance. Because of the variation in the sidewall angle, the magnetic field generated by the main pole 130 and used to write to the media 102 may be enhanced. The reverse overwrite gain may also be improved. The gradient in the magnetic field may also be improved while maintaining substantially the same side fields. As a result, adjacent track interference may not be adversely affected. Further, the pole tip region 132 of the main pole 130 may have an increased magnetic volume. Stated differently, the pole tip region 132 may include more magnetic material. As a result, the cross track magnetic anisotropy may be improved and domain lockup issues mitigated. Thus, performance of the disk drive 100 may be improved.

Figure 4A:
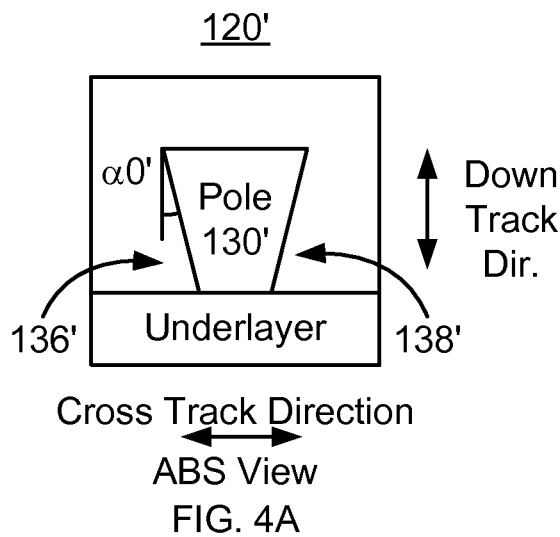
FIGS. 4A, 4B and 4C depict ABS, yoke and side views of an exemplary embodiment of a magnetic recording transducer.
Figure 4B:
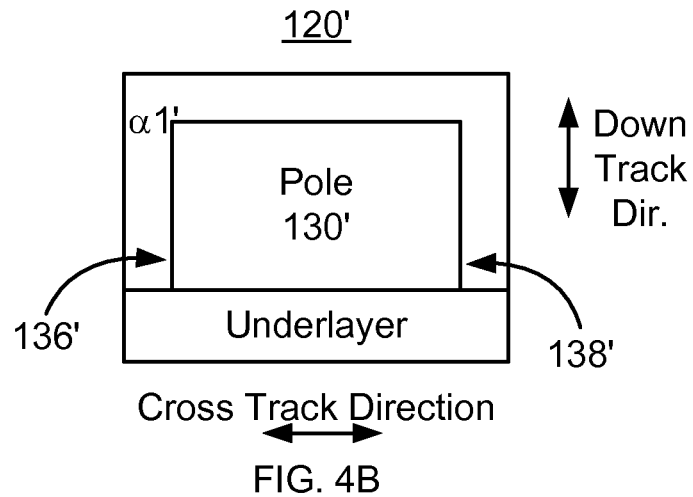
Figure 4C:
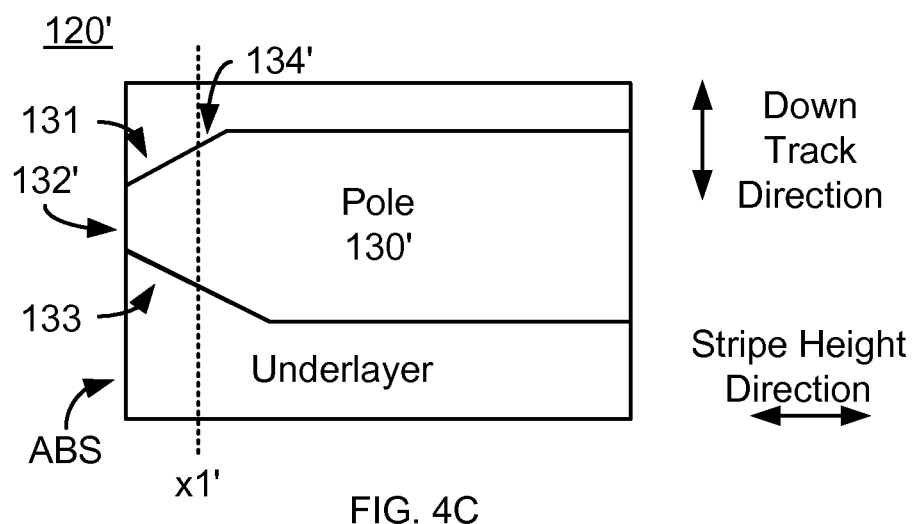

FIGS. 4A, 4B and 4C depict ABS, yoke and side views of a transducer 120' analogous to the transducer 120 in disk drive 100. For clarity, FIGS. 4A, 4B and 4C are not to scale. For simplicity not all portions of the transducer 120' are shown. Because the magnetic recording transducer 120' is analogous to the transducer 120 in the magnetic disk drive 100, analogous components have similar labels.

The transducer 120' includes a main pole 130' having sidewalls 136' and 138' that are analogous to the main pole 130 and sidewalls 136 and 138, respectively. The main pole 130' also includes a pole tip region 132' and a yoke region 134' that are analogous to the pole tip 132 and yoke 134, respectively. The pole tip region 132' is shown as having top and bottom bevels 131 and 133, respectively that are analogous to the bevels 131 and 133 depicted in FIGS. 2 and 3C. The sidewalls 136' and 138' are configured such that the pole 130' has a bottom and a top wider than the bottom.

The sidewalls 136' and 138' form sidewall angles α0' and α1' with respect to the down track direction at the ABS and x1', respectively. In some embodiments, α0' has a size range analogous to α0. For example, α0' may be at least twelve degrees and not more than fourteen degrees and in some embodiments may be nominally 13.5°. The sidewall angle α1' is less than α0' at x1'. In the embodiment shown, α1' is zero degrees. The distance x1' may also vary in a manner analogous to x1. In some embodiments, x1' is desired to be not more than the distance which the bevel 131 or 133 extends into the ABS. For example, in some embodiments, x1' is not more than two hundred nanometers. In some embodiments, x1' is desired to be closer to the ABS. In some embodiments, x1' is not more than eighty nanometers. For example, x1' may be at least 30 nm from the ABS if, for example, the processing tolerance in location of x1' is 10 nm. In general, x1' is desired to be sufficiently large that the sidewall angle α0' at the ABS remains unchanged. The manner in which the sidewall angle changes from α0' to α1' may vary. The sidewall angle may monotonically decrease between the ABS and x1'. In some embodiments, the sidewall angle smoothly varies from α0' to α1'. In other embodiments, the sidewall angle may change in step function(s) from α0' to α1'. These change(s) may occur at x1' or between the ABS and x1'. In other embodiments, the change may be linear or piece-wise linear. In other embodiments the change may be in accordance with a higher order function including but not limited to a quadratic function. However, other configurations are possible. Although the variation in sidewall angle is described herein in terms of step function(s) and other mathematical functions, one of ordinary skill in the art will recognize that there exist processing and/or other limitations or considerations. Therefore, the transitions of such a "step" function may be rounded and/or transitions may not be sharp. Similarly, "linear" regions may not be perfectly straight. Thus, the actual profile of the main poles may not precisely follow the mathematical functions used herein.

The magnetic transducer 120' may exhibit improved performance for analogous reasons to those discussed above. Because of the variations in the sidewall angle, the magnetic field generated by the main pole 130' may be increased. The reverse overwrite gain may also be improved. The gradient in the magnetic field may also be improved while maintaining substantially the same side fields. As a result, adjacent track interference may not be adversely affected. Further, the pole tip region 132' of the main pole 130' may have an increased magnetic volume. As a result, the cross track magnetic anisotropy may be improved and domain lockup issues mitigated. Thus, performance of the disk drive 100 may be improved.

FIGS. 5A, 5B, 5C and 5E depict ABS, first pole tip, second pole tip, yoke and side views, respectively, of a transducer 120" analogous to the transducers 120/120' and disk drive 100. For clarity, FIGS. 5A-5E are not to scale. For simplicity not all portions of the transducer 120" are shown. Because the magnetic recording transducer 120" is analogous to the transducers 120/120' in the magnetic disk drive 100, analogous components have similar labels.

The transducer 120" includes a main pole 130" having sidewalls 136" and 138" that are analogous to the main pole 130/130' and sidewalls 136/136' and 138/138', respectively. The main pole 130" also includes a pole tip region 132" and a yoke region 134" that are analogous to the pole tip 132/132' and yoke 134/134', respectively. The pole tip region 132" is shown as having top and bottom bevels 131 and 133, respectively, that are analogous to the bevels 131 and 133 depicted in FIGS. 2, 3C and 4C. The sidewalls 136" and 138" are configured such that the pole 130" has a bottom and a top wider than the bottom.

The sidewalls 136" and 138" form sidewall angles α0" and α1" with respect to the down track direction at the ABS and x1", respectively. In addition, the sidewalls 136" and 138"

form sidewall angles $\alpha 2$ and $\alpha 3$ at positions x2 and x3. In the embodiment shown, $\alpha 2$ and $\alpha 3$ are between $\alpha 0$ and $\alpha 1$. Thus, the sidewall angle monotonically decreases from the ABS to x2, x3 and x1. In some embodiments, $\alpha 0''$ has a size range analogous to $\alpha 0$. For example, $\alpha 0''$ may be at least twelve degrees and not more than fourteen degrees and in some embodiments may be nominally 13.5°. The sidewall angle $\alpha 1''$ is less than $\alpha 0''$ at x1''. In the embodiment shown, $\alpha 1''$ is zero degrees. The distance x1'' may also vary in a manner analogous to x1/x1'. In some embodiments, x1'' is desired to be not more than the distance which the bevel 131 or 133 extends into the ABS. For example, in some embodiments, x1'' is not more than two hundred nanometers. In some embodiments, x1'' is desired to be closer to the ABS as described above. In general, x1'' is desired to be sufficiently large that the sidewall angle $\alpha 0''$ at the ABS remains unchanged. The manner in which the sidewall angle changes from $\alpha 0''$ to $\alpha 1''$ may vary. In some embodiments, the sidewall angle smoothly varies from $\alpha 0'$ to $\alpha 1'$. In other embodiments, the sidewall angle may change in a manner analogous to step function(s) from $\alpha 0''$ to $\alpha 1''$. These change(s) may occur at x2, x3 and x1''. For example, $\alpha 2$ may be 11° and x2 may be approximately 50 nm within tolerances. Similarly, $\alpha 3$ may be 7° and x3 may be one hundred nanometers within tolerances. However, in other embodiments, other distances and other sidewall angles may be possible. In other embodiments, the change may be linear or piece-wise linear. For example, a new slope for each line segment may occur at x2, x3 and x1. In other embodiments the change may be in accordance with a higher power function including but not limited to a quadratic function. However, other configurations are possible. Although the variation in sidewall angle is described herein in terms of step function(s) and other mathematical functions, one of ordinary skill in the art will recognize that there exist processing and/or other limitations or considerations. Therefore, the transitions of such a "step" function may be rounded and/or transitions may not be sharp. Similarly, "linear" regions may not be perfectly straight. Thus, the actual profile of the main poles may not precisely follow the mathematical functions used herein.

The magnetic transducer 120'' may exhibit improved performance for analogous reasons to those discussed above. Because of the variations in the sidewall angle, the magnetic field generated by the main pole 130'' may be increased. The reverse overwrite gain may also be improved. The gradient in the magnetic field may also be improved while maintaining substantially the same side fields. As a result, adjacent track interference may not be adversely affected. Further, the pole tip region 132'' of the main pole 130'' may have an increased magnetic volume. As a result, the cross track magnetic anisotropy may be improved and domain lockup issues mitigated. Thus, performance of the disk drive 100 may be improved.

FIGS. 6A, 6B, 6C, 6D and 6E depict ABS, first pole tip, second pole tip, yoke and side views, respectively, of a transducer 120''' analogous to the transducers 120/120'/120'' and disk drive 100. For clarity, FIGS. 6A-6E are not to scale. For simplicity not all portions of the transducer 120''' are shown. Because the magnetic recording transducer 120''' is analogous to the transducers 120/120'/120'' in the magnetic disk drive 100, analogous components have similar labels.

The transducer 120''' includes a main pole 130''' having sidewalls 136''' and 138''' that are analogous to the main pole 130/130'/130'' and sidewalls 136/136'/136'' and 138/138'/138'', respectively. The main pole 130''' also includes a pole tip region 132''' and a yoke region 134''' that are analogous to the pole tip 132/132'/132'' and yoke 134/134'/134'', respectively. The pole tip region 132''' is shown as having top and bottom bevels 131 and 133, respectively, that are analogous to the bevels 131 and 133 depicted in FIGS. 2, 3C, 4C and 5C. The sidewalls 136''' and 138''' are configured such that the pole 130''' has a bottom and a top wider than the bottom.

The sidewalls 136''' and 138''' form sidewall angles $\alpha 0'''$ and $\alpha 1'''$ with respect to the down track direction at the ABS and x1''', respectively. In addition, the sidewalls 136''' and 138''' form sidewall angles $\alpha 2'$ and $\alpha 3'$ at positions x2' and x3'. In the embodiment shown, $\alpha 2'$ and $\alpha 3'$ are substantially equal to $\alpha 0'''$. Thus, the sidewall angle is substantially constant from the ABS to x2 and at least x3. In some embodiments, $\alpha 0'''$ has a size range analogous to $\alpha 0$. For example, $\alpha 0'''$ may be at least twelve degrees and not more than fourteen degrees and in some embodiments may be nominally 13.5°. The sidewall angle $\alpha 1'''$ is less than $\alpha 0'''$ at x1'''. In the embodiment shown, $\alpha 1'''$ is zero degrees. The distance x1''' may vary in a manner analogous to x1/x1'/x1''. In some embodiments, x1''' is desired to be not more than the distance which the bevel 131 or 133 extends into the ABS. For example, in some embodiments, x1''' is not more than two hundred nanometers. In some embodiments, x1''' is desired to be closer to the ABS as described above. In general, x1''' is desired to be sufficiently large that the sidewall angle $\alpha O'''$ at the ABS remains unchanged. The manner in which the sidewall angle changes from $\alpha 0'''$ to $\alpha 1'''$ may vary. In some embodiments, the sidewall angle may change in a step function from $\alpha 0'''$ to $\alpha 1'''$ at some location after x3' and by x1'''. However, other configurations are possible. Although the variation in sidewall angle is described herein in terms of step function(s) and other mathematical functions, one of ordinary skill in the art will recognize that there exist processing and/or other limitations or considerations. Therefore, the transitions of such a "step" function may be rounded and/or transitions may not be sharp. Similarly, "linear" regions may not be perfectly straight. Thus, the actual profile of the main poles may not precisely follow the mathematical functions used herein.

The magnetic transducer 120''' may exhibit improved performance for analogous reasons to those discussed above. Because of the variations in the sidewall angle, the magnetic field generated by the main pole 130''' may be increased. The reverse overwrite gain may also be improved. The gradient in the magnetic field may also be improved while maintaining substantially the same side fields. As a result, adjacent track interference may not be adversely affected. Further, the pole tip region 132''' of the main pole 130''' may have an increased magnetic volume. As a result, the cross track magnetic anisotropy may be improved and domain lockup issues mitigated. Thus, performance of the disk drive 100 may be improved.

Figure 7:
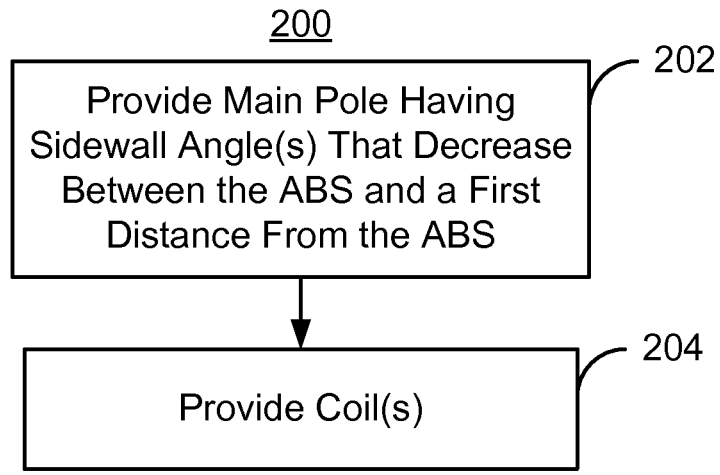
FIG. 7 depicts a flow chart of an exemplary embodiment of a method for providing magnetic recording transducer.

FIG. 7 depicts an exemplary embodiment of a method 300 for providing a magnetic recording transducer 120 having a main pole that may has a varying sidewall angle, such as main pole 130, 130', 130'', and/or 130'''. For simplicity, some steps may be omitted, interleaved, and/or combined. The method 200 is also described in the context of providing a magnetic recording head 100 and transducer 120 depicted in FIGS. 2, 3A, 3B and 3C. However, the method 200 may be used to fabricate multiple magnetic recording heads at substantially the same time. The method 200 may also be used to fabricate other magnetic recording transducers including but not limited to any combination of 120, 120', 120'', and/or 120'''. The method 200 is also described in the context of particular layers. A particular layer may include multiple materials and/or multiple sub-layers. The method 200 also may start after formation of other portions of the magnetic recording head. For example, the method 200 may start after a read transducer, return pole/shield and/or other structure have been fabricated.

Referring to FIGS. 2, 3A-3C and 7, the main pole 130 is provided, via step 202. Step 202 may include using one or more damascene processes. For example, a trench may be formed in a layer. The trench may be fabricated such that portions of the trench sidewalls form different angles with the down track direction. The material(s) for the pole 130 deposited, for example via plating. One or more ferromagnetic materials may be used. The pole tip 132 and yoke 134 may be formed. Other methods may also be used to form the pole 130 including but not limited to full film deposition of magnetic materials and removal for example via milling and/or lapping.

The coil(s) 140 are provided, via step 204. Portions of step 204 may thus be interleaved with the remaining steps of the method 200. For example, portions of the coil 140 may be provided before the formation of the main pole 130. However, other portions of the coil 140 may be provided after some or all of the main pole 130 has been formed. Step 204 may also include depositing and patterning the material(s) used for the coil(s) 140. Step 204 may include forming a single helical coil or one or more pancake/spiral coil. In such embodiments, a pancake coil 140 may include other turns far from the ABS.

Using the method 200, the magnetic disk drive 100 and magnetic transducers 120, 120', 120" and/or 120'" may be provided. Thus, the benefits of the magnetic transducers 120, 120', 120" and/or 120'" may be achieved.

Figure 8:
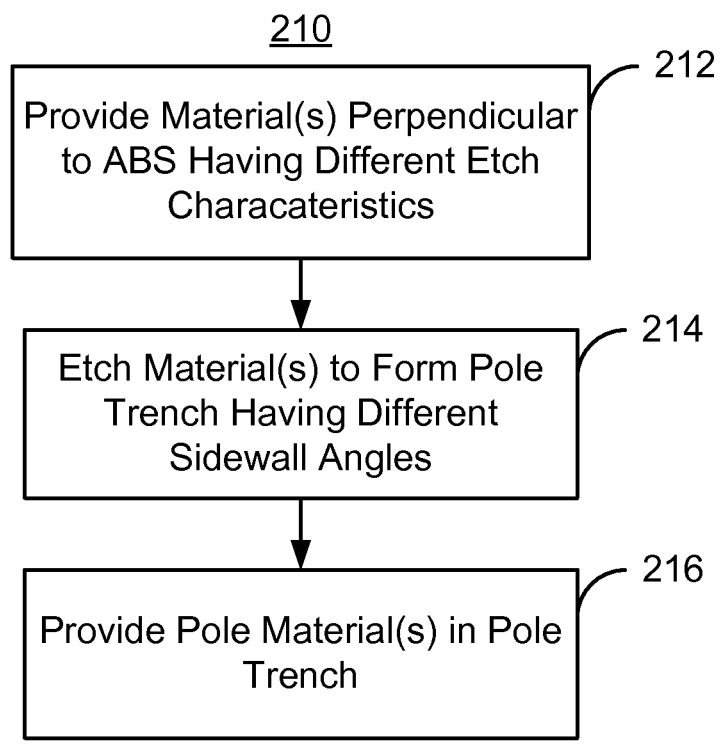
FIG. 8 depicts a flow chart of an exemplary embodiment of a method for fabricating a portion of a magnetic recording transducer.

FIG. 8 depicts an exemplary embodiment of a method 210 for providing a magnetic recording transducer 120 having a main pole that may has a varying sidewall angle, such as main pole 130, 130', 130", and/or 130'". For simplicity, some steps may be omitted, interleaved, and/or combined. The method 210 is also described in the context of providing a magnetic recording head 100 and transducer 120 depicted in FIGS. 2, 3A, 3B and 3C. However, the method 210 may be used to fabricate multiple magnetic recording heads at substantially the same time. The method 210 may also be used to fabricate other magnetic recording transducers including but not limited to any combination of 120, 120', 120", and/or 120'". The method 210 is also described in the context of particular layers. A particular layer may include multiple materials and/or multiple sub-layers. The method 210 also may start after formation of other portions of the magnetic recording head. For example, the method 210 may start after a read transducer, return pole/shield and/or other structure have been fabricated.

Referring to FIGS. 2, 3A-3C and 8, materials are provided in layers that are perpendicular to the ABS, via step 212. For example, one material may extend from the ABS to x1, while another extends from x1 to further from the ABS. In other embodiments, such as the transducer 120", one material may extend from the ABS to x2, another from x2 to x3, a third from x3 to x1 and a fourth from x1 to further from the ABS.

A trench is etched for the pole, via step 204. Step 204 may include using one or more damascene processes. The different materials may have different etch characteristics. Consequently, each material may etch a different amount and provide a portion of the trench that has a different profile. Thus, the trench may have different sidewall angles at different distances from the ABS. The material(s) for the pole 130 deposited, via step 216. One or more ferromagnetic materials may be plated. The pole tip 132 and yoke 134 may be formed.

Using the method 210, the main pole 130/130'/130"/130'", magnetic disk drive 100 and magnetic transducers 120, 120', 120" and/or 120'" may be provided. Thus, the benefits of the magnetic transducers 120, 120', 120" and/or 120'" may be achieved.

We claim:

1. A magnetic transducer having air-bearing surface (ABS) comprising:
   a main pole including a pole tip region and a yoke region, the pole tip region including a plurality of sidewalls, a bottom surface, and a top surface wider than the bottom surface, the plurality of sidewalls being between the top surface and the bottom surface, the top surface being opposite to the bottom surface and in a down track direction from the bottom surface, at least one of the plurality of sidewalls forming a first sidewall angle with a down track direction at the ABS and a second sidewall angle with the down track direction at a first distance recessed from the ABS in a yoke direction perpendicular to the ABS, the first sidewall angle being greater than the second sidewall angle, the down track direction being parallel to the ABS and perpendicular to the yoke direction, the first sidewall angle and the second sidewall angle being formed by the at least one of the plurality of sidewalls at the bottom surface of the main pole; and
   at least one coil for energizing the main pole.

2. The magnetic transducer of claim 1 wherein the second sidewall angle is zero degrees.

3. The magnetic transducer of claim 1 wherein the plurality of sidewalls form a third sidewall angle with the down track direction at a second distance recessed from the ABS, the second distance being less than the first distance and the third sidewall angle being greater than the second sidewall angle.

4. A magnetic transducer having air-bearing surface (ABS) comprising:
   a main pole including a pole tip region and a yoke region, the pole tip region including a plurality of sidewalls, a bottom surface, and a top surface wider than the bottom surface, the plurality of sidewalls being between the top surface and the bottom surface, the top surface being opposite to the bottom surface and in a down track direction from the bottom surface, at least one of the plurality of sidewalls forming a first sidewall angle with a down track direction at the ABS and a second sidewall angle with the down track direction at a first distance recessed from the ABS in a yoke direction perpendicular to the ABS, the first sidewall angle being greater than the second sidewall angle, the down track direction being parallel to the ABS and perpendicular to the yoke direction, wherein the plurality of sidewalls form a third sidewall angle with the down track direction at a second distance recessed from the ABS, the second distance being less than the first distance and the third sidewall angle being greater than the second sidewall angle and wherein the plurality of sidewalls form a fourth sidewall angle with the down track direction at a third distance recessed from the ABS, the third distance being less than the first distance and the fourth sidewall angle being greater than the second sidewall angle; and
   at least one coil for energizing the main pole.

5. The magnetic transducer of claim 1 wherein the plurality of sidewalls form the first sidewall angle between the ABS and the first distance.

6. The magnetic transducer of claim 1 wherein the plurality of sidewalls form a sidewall angle with the down track direction that substantially monotonically decreases between the first sidewall angle and the second sidewall angle.

7. The magnetic transducer of claim 1 wherein the plurality of sidewalls form a sidewall angle with the down track direction that substantially linearly decreases between the first sidewall angle and the second sidewall angle.

8. The magnetic transducer of claim 1 wherein the plurality of sidewalls form a sidewall angle with the down track direction that decreases between the first sidewall angle and the second sidewall angle in accordance with a piecewise linear manner.

9. The magnetic transducer of claim 1 wherein the plurality of sidewalls form a sidewall angle with the down track direction that decreases between the first sidewall angle and the second sidewall angle in accordance with at least one step function.

10. The magnetic transducer of claim 1 wherein the plurality of sidewalls form a sidewall angle with the down track direction that decreases between the first sidewall angle and the second sidewall angle in accordance with a function having a power greater than one.

11. The magnetic transducer of claim 1 wherein the first sidewall angle is at least eleven degrees and not more than fifteen degrees.

12. The magnetic transducer of claim 1 wherein the first distance is greater than zero and not more than two hundred nanometers.

13. The magnetic transducer of claim 12 wherein the first distance is at least ten nanometers and not more than one hundred nanometers.

14. The magnetic transducer of claim 12 wherein the first distance is at least thirty nanometers and not more than eighty nanometers.

15. The magnetic transducer of claim 1 wherein the main pole further includes a bevel extending a bevel distance from the ABS, the first distance being less than or equal to the bevel distance.

16. A disk drive comprising:
a magnetic recording medium,
a slider, and
a magnetic transducer coupled with the slider, the magnetic transducer having air-bearing surface (ABS), a main pole and at least one coil for energizing the main pole, the main pole including a pole tip region and a yoke region, the pole tip region including a plurality of sidewalls, a bottom surface, and a top surface wider than the bottom surface, the plurality of sidewalls being between the top surface and the bottom surface, the top surface being opposite to the bottom surface and in a down track direction from the bottom surface, the magnetic recording medium moving in the down track direction with respect to the magnetic transducer, at least one of the plurality of sidewalls forming a first sidewall angle with a down track direction at the ABS and a second sidewall angle with the down track direction at a first distance recessed from the ABS in a yoke direction perpendicular to the ABS, the first sidewall angle being greater than the second sidewall angle, the down track direction being parallel to the ABS and perpendicular to the yoke direction, the first sidewall angle and the second sidewall angle being formed by the at least one of the plurality of sidewalls at the bottom surface of the main pole.

17. A method for fabricating magnetic transducer having air-bearing surface (ABS) comprising:
providing a main pole including a pole tip region and a yoke region, the pole tip region including a plurality of sidewalls, a bottom surface, and a top surface wider than the bottom surface, the plurality of sidewalls being between the top surface and the bottom surface, the top surface being opposite to the bottom surface and in a down track direction from the bottom surface, at least one of the plurality of sidewalls forming a first sidewall angle with a down track direction at the ABS and a second sidewall angle with the down track direction at a first distance recessed from the ABS in a yoke direction perpendicular to the ABS, the first sidewall angle being greater than the second sidewall angle, the down track direction being parallel to the ABS and perpendicular to the yoke direction, the first sidewall angle and the second sidewall angle being formed by the at least one of the plurality of sidewalls at the bottom surface of the main pole; and
providing at least one coil for energizing the main pole.

18. The method of claim 17 wherein the second sidewall angle is zero degrees.

19. The method of claim 17 wherein the step of providing the main pole further includes:
configuring the plurality of sidewalls to form a third sidewall angle with the down track direction at a second distance recessed from the ABS, the second distance being less than the first distance and the third sidewall angle being greater than the second sidewall angle.

20. A method for fabricating magnetic transducer having air-bearing surface (ABS) comprising:
providing a main pole including a pole tip region and a yoke region, the pole tip region including a plurality of sidewalls, a bottom surface, and a to surface wider than the bottom surface, the plurality of sidewalls being between the to surface and the bottom surface, the top surface being opposite to the bottom surface and in a down track direction from the bottom surface, at least one of the plurality of sidewalls forming a first sidewall angle with a down track direction at the ABS and a second sidewall angle with the down track direction at a first distance recessed from the ABS in a yoke direction perpendicular to the ABS, the first sidewall angle being greater than the second sidewall angle, the down track direction being parallel to the ABS and perpendicular to the yoke direction wherein the step of providing the main pole further includes
configuring the plurality of sidewalls to form a third sidewall angle with the down track direction at a second distance recessed from the ABS, the second distance being less than the first distance and the third sidewall angle being greater than the second sidewall angle; and
configuring plurality of sidewalls to form a fourth sidewall angle with the down track direction at a third distance recessed from the ABS, the third distance being less than the first distance and the fourth sidewall angle being greater than the second sidewall angle; and
providing at least one coil for energizing the main pole.

21. The method of claim 17 wherein the plurality of sidewalls form the first sidewall angle between the ABS and the first distance.

22. The method of claim 17 wherein the step of providing the main pole further includes:
configuring the plurality of sidewalls to form a sidewall angle with the down track direction that substantially monotonically decreases between the first sidewall angle and the second sidewall angle.

23. The method of claim 17 wherein the step of providing the main pole further includes:
configuring the plurality of sidewalls to form a sidewall angle with the down track direction that substantially linearly decreases between the first sidewall angle and the second sidewall angle.

24. The method of claim 17 wherein the step of providing the main pole further includes:
   configuring the plurality of sidewalls form a sidewall angle with the down track direction that decreases between the first sidewall angle and the second sidewall angle in accordance with a piecewise linear manner.

25. The method of claim 17 wherein the step of providing the main pole further includes:
   configuring the plurality of sidewalls form a sidewall angle with the down track direction that decreases between the first sidewall angle and the second sidewall angle in accordance with at least one step function.

26. The method of claim 17 wherein the step of providing the main pole further includes:
   configuring the plurality of sidewalls form a sidewall angle with the down track direction that decreases between the first sidewall angle and the second sidewall angle in accordance with a function having a power greater than one.

27. The method of claim 17 wherein the step of providing the main pole further includes:
   providing a plurality of layers in a direction substantially perpendicular to the ABS, the plurality of materials having a plurality of removal characteristics;
   removing a portion of each of the plurality of layers to form a pole trench in the plurality of layers, the pole trench having a location and a profile corresponding to the main pole; and
   providing at least one pole material in the pole trench.

28. The method of claim 17 wherein the main pole further includes a bevel extending a bevel distance from the ABS, the first distance being less than or equal to the bevel distance.

* * * * *